United States Patent [19]

Hayashi et al.

[11] Patent Number: 5,323,364
[45] Date of Patent: Jun. 21, 1994

[54] COVER DEVICE FOR ELECTRONIC APPARATUS CASE

[75] Inventors: Takahiro Hayashi; Junichiro Sei, both of Yokohama; Hiroshi Ohmura, Kawasaki, all of Japan

[73] Assignee: Matsushita Electric Industrial Co., Ltd., Osaka, Japan

[21] Appl. No.: 884,930

[22] Filed: May 18, 1992

[30] Foreign Application Priority Data

May 24, 1991 [JP] Japan .................................. 3-120490

[51] Int. Cl.⁵ ...................... G04B 37/00; B65D 41/06
[52] U.S. Cl. ...................... 368/276; 368/313; 220/260; 220/302
[58] Field of Search ............ 368/10, 88, 276–278, 368/309–313; 220/260, 288, 291, 293, 297, 298, 301–302

[56] References Cited

U.S. PATENT DOCUMENTS

| | | |
|---|---|---|
| 2,732,970 | 1/1956 | Hogan et al. ......................... 220/302 |
| 3,947,917 | 4/1976 | Schwartzstein ......................... 16/30 |
| 4,353,661 | 10/1982 | Ruther ......................... 403/171 |
| 5,026,279 | 6/1991 | Wilkes ......................... 433/60 |
| 5,155,659 | 10/1992 | Kunert ......................... 361/38 |

FOREIGN PATENT DOCUMENTS 646555 11/1950 United Kingdom .

*Primary Examiner*—Vit W. Miska
*Attorney, Agent, or Firm*—Stevens, Davis, Miller & Mosher

[57] ABSTRACT

In an electronic apparatus case, the cover thereof mounted on one side of the case body through the intermediary of a hinge member so that the cover can be opened and closed by the same. Further, a substantially T-shaped lock member is rotatably mounted on the other side of the case body and, at the same time, an elongated lock hole is formed on the side of the cover corresponding to the lock member, so that the cover can be secured in position by allowing the head section of the lock member to pass through the lock hole of the cover and rotating the lock member by 90°.

8 Claims, 2 Drawing Sheets

COVER DEVICE FOR ELECTRONIC APPARATUS CASE

BACKGROUND OF THE INVENTION

The present invention relates to a cover device for opening and closing the interior of the case of a small electronic apparatus when, for example, it is necessary to repair or replace an electronic part or a battery or the like lodged in the case.

Conventionally, the case of such an electronic apparatus comprises a case body and a cover attached thereto by a plurality of screws. To open the interior of the case body, the cover is separated from the case body by removing the screws.

A problem with this structure is that the cover is completely separated from the case body, so that the cover may get lost when separated. Further, since the cover is attached to the case body by screws, a special tool for removing the screws, such as a driver, is needed. In other words, without such a special tool, the cover cannot be opened.

SUMMARY OF THE INVENTION

The present invention has been made with a view to solve the above problem in the prior art. It is accordingly an object of this invention to provide an excellent cover device for the case of an electronic apparatus which helps to prevent the cover from being lost and makes it possible for the cover to be easily secured in position, or opened and closed, with respect to the case body.

To achieve the above object, the present invention provides a cover device comprising: a cover rotatably mounted on one side of a case body through the intermediary of a hinge member; a substantially T-shaped lock member rotatably mounted on the other side of the case body; and an elongated lock hole which is formed on the side of the cover corresponding to the lock member and which allows a head section of the lock member to pass therethrough.

In a form of the present invention, a slot into which a coin can be inserted is provided on the top surface of the head section of the lock member.

In another form of the present, invention, a spring for pulling the lock member toward the case body is provided.

In still another form of the present invention, a fitting recess crossing the lock hole of the cover and adapted to hold the head section of the lock member is passed through the lock hole and rotated.

In a further form of the present invention, the lock member is equipped with a packing which seals the gap between the lock hole of the cover and the interior of the case body in a watertight fashion.

In accordance with the present invention, the cover is attached to the case body through the intermediary of a hinge member, so that the cover can be easily opened and closed by rotating it. Further, the cover is not separated from the case body when opened, thus preventing the cover from getting lost.

By closing the cover with respect to the case body, the head section of a T-shaped lock member is inserted into the lock hole of the cover. By rotating the lock member in this condition, the cover can be locked and secured in position with respect to the case body easily and reliably.

Since the lock member has on the head section thereof a slot into which a coin can be inserted, the lock member can be rotated with a coin without using any special tool such as a driver.

Further, due to the spring for pulling the lock member toward the case body, the cover can be pressed against the case body when closed, thereby enabling the cover to be firmly secured in position.

In addition, due to the fitting recess crossing the lock hole of the cover, the rotational movement of the head section of the lock member in the locked position is restricted, thereby preventing the lock from being released by an unexpected external force.

Still further, by providing the lock member with a packing for sealing the gap between the lock hole of the cover and the interior of the case body, it is possible to prevent intrusion of water into the interior of the case body through the lock hole.

DETAILED DESCRIPTION OF THE PREFERRED EMBODIMENT

Figure 1:
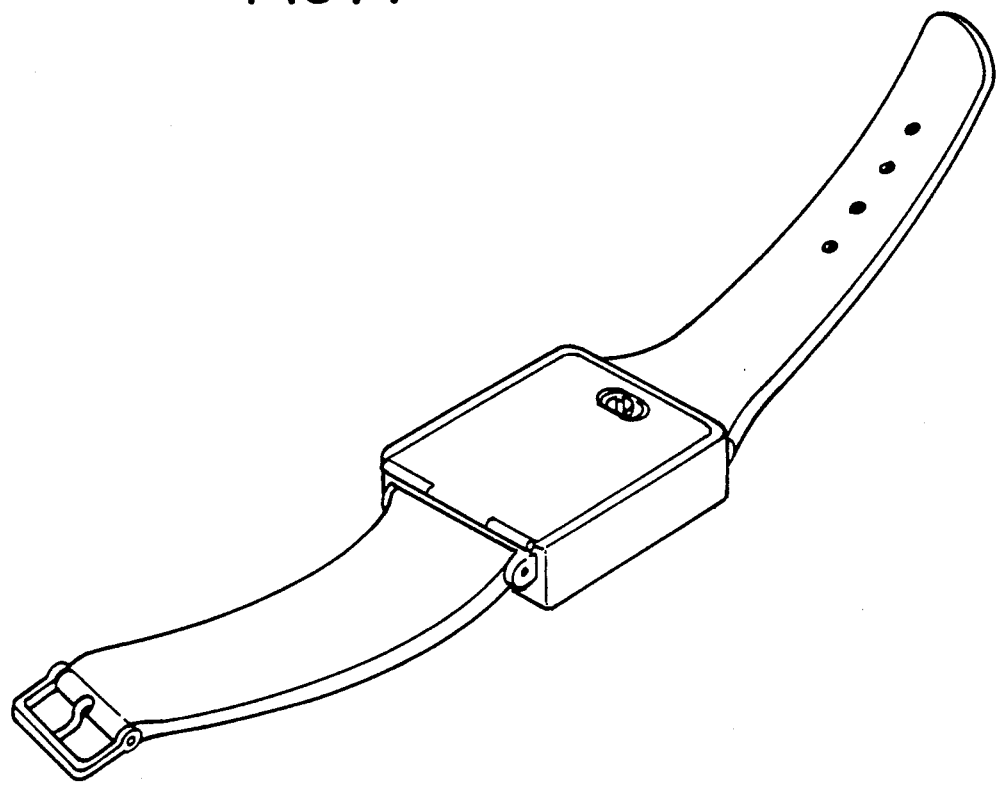
FIG. 1 is a perspective of a watch-type pager to which the cover device for an electronic apparatus case of the present invention is applied.
Figure 2:
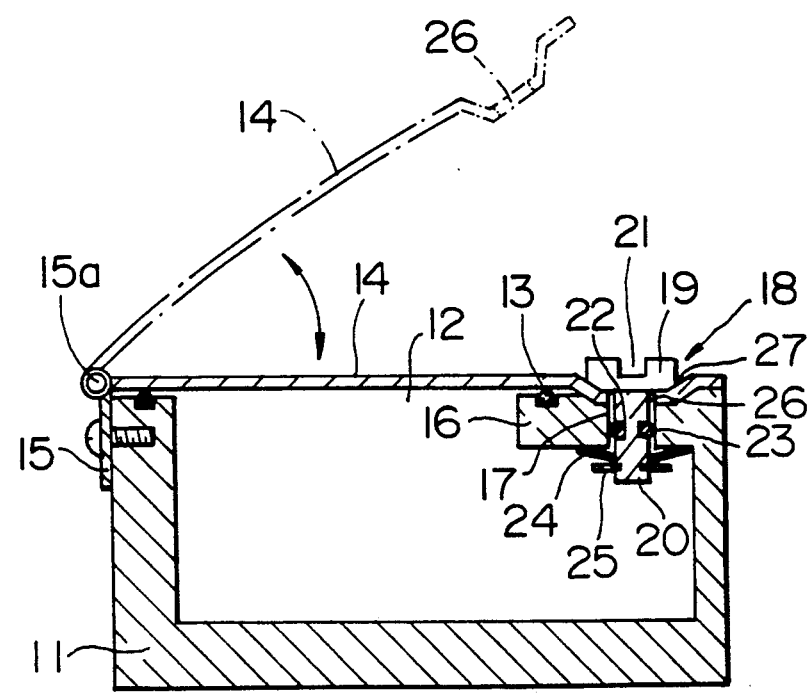
FIG. 2 is a schematic sectional view of a cover device for an electronic apparatus case in accordance with an embodiment of the present invention.

An embodiment of the present invention will now be described with reference to the accompanying drawings, of which FIG. 1 shows a perspective view of a watch-type pager to which the cover device for an electronic apparatus case according to the present invention is applied, and FIGS. 2 through 5 show the construction of an embodiment of the present invention. In FIG. 2, numeral 11 indicates a case body which has an opening 12 on the upper surface thereof. Numeral 13 indicates a packing provided along the peripheral section of the opening 12. Numeral 14 indicates a cover, which is rotatably attached to one side of the case body 11 through the intermediary of a hinge member 15.

Figure 3:
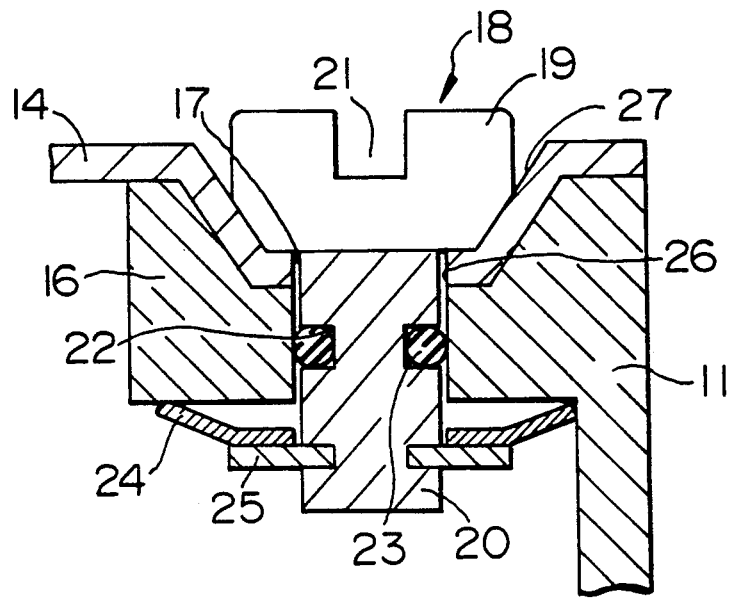
FIG. 3 is an enlarged schematic sectional view of the device, showing a lock member and a lock hole.

Provided in the middle section of the other side of the case body 11 is an inwardly protruding lug 16, in a predetermined section of which a vertically extending attachment hole 17 is formed (FIG. 2). A lock member 18 for the cover 14 is inserted into the attachment hole 17. As shown in FIG. 3, the lock member 18 as a whole has a T-shaped configuration, and comprises a substantially square-pole-shaped head section 19 and a square-pole-shaped body section 20 connected to the center of the bottom surface of the head section 19. Formed on the top surface of the head section 19 is a slot 21 into which the peripheral edge part of a coin can be inserted. Lower end portions 21a of the head section 19 are tapered to form conical surfaces. Formed on the entire periphery of the middle portion of the body section 20 is a groove 22, into which a ring-like rubber packing 23 is fitted. The body section 20 of the lock member 18 protrudes downwardly beyond an end of the attachment hole 17 of the lug 16 of the case body, and a coned disc spring 24 is attached to the lower portion of the protruding portion of the body section 20. The coned disc spring 24 is compressed between a stop member 25 and the section of the lug 16 which surrounds the attachment hole 17, thereby biasing the lock member 18 toward the case body 11. Accordingly, although the lock member 18 is allowed to rotate to the right and left within the attachment hole 17, it is prevented from being detached from the case body 11.

Figure 4:
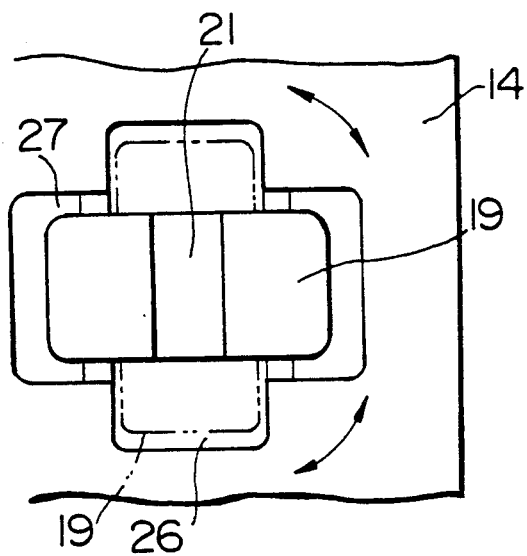
FIG. 4 is an enlarged schematic plan view of the device, showing the lock member and the lock hole.
Figure 5:
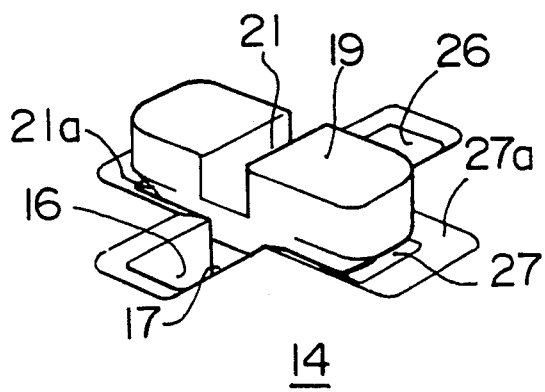
FIG. 5 shows a perspective view of the lock member and the lock hole shown in FIG. 3.

As shown in FIG. 4, a lock hole 26 through which the head section 19 of the lock member 18 can pass is formed in the middle portion of one side section of the cover 14, at a position corresponding to the lock member 18. Further, a recess 27 for receiving the head section 19 in a stable manner is formed in such a way as to cross the lock hole 26 of the cover 14. Formed in the peripheral portions of the recess 27 are slopes 27a, which cooperate with the conical surfaces of the head section 19 of the lock member 18 to enable the head section 19 of the lock member 18 to easily enter and leave the recess 27. Further, formed on the upper surface of the lug 16 is a complementary recess for receiving the bottom surface portion of the recess 27.

Next, the operation of the above embodiment will be described with reference to FIG. 2. Since the cover 14 is mounted on one side of the case body 11 through the intermediary of the hinge member 15, the cover 14 is adapted to open and close the opening 12 of the case body 11 by rotating on a hinge axle 15a.

When the cover 14 is closed, the head section 19 of the lock member 18 on the lug 16 of the case body 11 is adjusted beforehand to correspond to the lock hole 26 of the cover 14. When the cover 14 is rotated to be placed on the case body 11, the head section 19 of the lock member 18 passes through the lock hole 26. In this condition, a coin or a driver is inserted into the slot 21 on the head section 19 to rotate the head section 19 to the right or left by 90°, thereby engaging the head section 19 of the lock member 18 with the recess 27 crossing the lock hole 26. In this way, the cover 14 is locked.

Since the lock member 18 is pulled toward the case body 11 by the spring 24, the cover 14 locked by the head section 19 of the lock member 18 is pressed against the case body 11.

Further, combined with the pulling of the lock member 18 toward the case body 11 by the spring 24, the engagement of the head section 19 with the fitting recess 27 crossing the lock hole 26 causes the rotational movement of the head section 19 of the lock member 18 to be restricted.

Thus, in accordance with the above-described embodiment, the cover 14 is rotatably mounted on one side of the case body 11 through the intermediary of the hinge member 15, so that the cover 14 can be easily opened and closed and, at the same time, the cover 14 can be opened without being separated from the case body 11, thereby preventing the cover 14 from getting lost.

Further, since the cover 14 is locked by inserting the substantially T-shaped lock member 18 of the case body 11 into the lock hole 26 of the cover 14 and rotating the head section 19 of the lock member by 90°, the cover 14 can be secured in position with respect to the case body 11 easily and reliably.

In addition, due to the provision of the slot 21 on the upper surface of the head section 19, the lock member 18 can be easily rotated by a coin even if the user has no special tool, such as a driver.

Still further, since the lock member 18 is attached to the attachment hole 17 of the case body 11 in such a way as to be biased toward the case body 11 by the spring 24 to cause the head section 19 of the lock member 18 to press the cover 14 against the case body 11, the cover 14 can be reliably secured in position with respect to the case body 11 and, at the same time, the packing 13 in the peripheral section of the opening 12 of the case body 11 is compressed to provide a waterproofing effect.

Also, due to the ring-like packing 23 attached to the body section 20 of the lock member 18, the gap between the lock hole 26 of the cover 14 and the interior of the case body 11 can be sealed in a watertight fashion, so that, combined with the waterproofing effect of the packing 13 in the peripheral section of the case body opening 12, intrusion of water into the interior of the case body 11 can be reliably prevented.

Further, as is apparent from FIG. 2, the cover 14 is outwardly convex, so that the hinge member hardly comes in contact with the skin of the user. Accordingly, there is no danger of the user's getting hurt by the hinge member.

Thus, the construction described above can be suitably used, for example, for the cover of the battery lodging section of the case of a small electronic apparatus, such as a watch-type pager, and is convenient to use, waterproof, etc.

What is claimed is:

1. A cover device for a case for an electronic apparatus, said case having an opening defining a first side and a second side opposite to said first side, said cover device comprising:
    a hinge means attached to said case at said first side of said opening;
    a cover means, attached to said hinge means so as to be rotatable at said first side of said opening, for opening and closing said opening, said cover means having a lock hole formed therein; and
    locking means, disposed on said case at said second side of said opening, for locking said cover means in a closed position, said locking means comprising (i) a lock member disposed so as to engage with said cover means through said lock hole when said cover means closes said opening and to be turned between a locked position, in which said cover means is fastened to said case in a closed position and cannot be released from said lock member, and an unlocked position in which said cover means can be released from said lock member; and (ii) an urging means for urging said lock member in a direction for fastening said cover means to said case in said closed position.

2. A cover device according to claim 1, wherein said urging means comprises a spring.

3. A cover device according to claim 1, wherein said case is a pager case.

4. A cover device according to claim 1, wherein:
    said lock member has a substantially T-like shape to provide a bar-like head section having a top surface and a bottom surface and a bar-like leg section having a free end part;
    said case comprises a lug protruding into said case from said second side of said opening and having an upper surface for receiving said cover means and a lower surface opposite to said upper surface, said lug having a through-hole through which said leg section of said lock member extends with said free end part protruding from said lower surface of said lug;

said lock hole has an elongated shape to permit said bar-like head section of said lock member to pass through said lock hole to engage said leg section of said lock member with said cover means through said lock hole when said lock member is disposed in said unlocked position;

said lock member is rotatable so as to be placed in said locked position by turning said head section to prevent said leg section from disengaging with said cover means through said lock hole; and said urging means comprises a spring having a first end retained to said free end part of said leg section and a second end retained at said lower surface of said lug.

5. A cover device according to claim 4, wherein said top surface of said head section of said lock member has a slot for receiving a coin.

6. A cover device according to claim 4, wherein said cover means has a fitting recess crossing said lock hole for holding said head section of said lock member when said head section is passed through said lock hole and rotated into said locked position.

7. A cover device according to claim 4, further comprising a packing means, fitted on said leg section of said lock member, for sealing a gap between said leg section and said through hole in said lug.

8. A cover device according to claim 6, wherein said bottom surface of said head section of said lock member comprises conical surfaces on opposite end portions of said head section.

* * * * *